US012589556B2

(12) United States Patent (10) Patent No.: US 12,589,556 B2
Merzhaeuser (45) Date of Patent: Mar. 31, 2026

(54) PULTRUDED FIBRE-REINFORCED STRIP FOR A REINFORCED STRUCTURE, SUCH AS A SPAR CAP

(71) Applicant: LM WIND POWER A/S, Kolding (DK)

(72) Inventor: Thomas Merzhaeuser, Salzbergen (DE)

(73) Assignee: LM WIND POWER A/S, Kolding (DK)

( * ) Notice: Subject to any disclaimer, the term of this patent is extended or adjusted under 35 U.S.C. 154(b) by 74 days.

(21) Appl. No.: 17/926,464

(22) PCT Filed: Jun. 4, 2021

(86) PCT No.: PCT/EP2021/064990
§ 371 (c)(1),
(2) Date: Nov. 18, 2022

(87) PCT Pub. No.: WO2021/245225
PCT Pub. Date: Dec. 9, 2021

(65) Prior Publication Data
US 2023/0182405 A1 Jun. 15, 2023

(30) Foreign Application Priority Data
Jun. 4, 2020 (GB) ...................................... 2008395

(51) Int. Cl.
*B29C 70/08* (2006.01)
*B29C 70/52* (2006.01)
(Continued)

(52) U.S. Cl.
CPC .............. *B29C 70/08* (2013.01); *B29C 70/52* (2013.01); *F03D 1/0675* (2013.01);
(Continued)

(58) Field of Classification Search
CPC ................................. B29C 70/08; B29C 70/52
(Continued)

(56) References Cited

U.S. PATENT DOCUMENTS

2008/0159871 A1* 7/2008 Bech ...................... F03D 1/0675
416/241 A
2009/0242119 A1* 10/2009 Bech ........................ F03D 1/065
156/307.1

(Continued)

FOREIGN PATENT DOCUMENTS

DE 102017113757 A1 * 12/2018
EP 3060385 B1 10/2017
EP 3477097 A1 5/2019

OTHER PUBLICATIONS

Machine_English_translation_DE_102017113757_A1; Klein et al.; Pultruded; Dec. 27, 2018; EPO; whole document (Year: 2024).*

*Primary Examiner* — Tahseen Khan
(74) *Attorney, Agent, or Firm* — Nath, Goldberg & Meyer; Jerald L. Meyer; Tanya E. Harkins

(57) ABSTRACT

A pultruded fibre-reinforced strip configured to be stacked with one or more similar strips to form a spar cap of a wind turbine blade, comprising
a core comprising a plurality of first fibres embedded in a resin matrix, the plurality of first fibres being carbon fibres and/or glass fibres, and
a surface layer enclosing and covering the core and comprising a plurality of second fibres Imbedded in the resin matrix, the majority of the plurality of second fibres having an elastic modulus less than 10 GPa.

19 Claims, 5 Drawing Sheets

(51) Int. Cl.
| | |
|---|---|
| *F03D 1/06* | (2006.01) |
| *B29K 223/00* | (2006.01) |
| *B29K 267/00* | (2006.01) |
| *B29K 307/04* | (2006.01) |
| *B29L 31/08* | (2006.01) |

(52) U.S. Cl.
CPC ...... *B29K 2223/06* (2013.01); *B29K 2267/00* (2013.01); *B29K 2307/04* (2013.01); *B29L 2031/085* (2013.01)

(58) Field of Classification Search
USPC ........................................................ 428/220
See application file for complete search history.

(56) References Cited

U.S. PATENT DOCUMENTS

| | | | | |
|---|---|---|---|---|
| 2011/0123346 A1* | 5/2011 | Hancock | .............. | F03D 1/0675 |
| | | | | 416/241 A |
| 2014/0193269 A1* | 7/2014 | Wetzel | ..................... | B32B 7/03 |
| | | | | 428/113 |
| 2015/0224721 A1* | 8/2015 | Bendel | ................... | F01D 5/147 |
| | | | | 264/553 |
| 2017/0082089 A1 | 3/2017 | Yarbrough et al. | | |
| 2017/0218918 A1* | 8/2017 | Cieslak | ..................... | B32B 5/12 |
| 2019/0153995 A1* | 5/2019 | Tobin | ................... | B29C 70/302 |
| 2019/0211801 A1* | 7/2019 | Ravn | ................... | F03D 1/0675 |
| 2022/0112876 A1* | 4/2022 | Merzhaeuser | ........ | F03D 1/0675 |

* cited by examiner

PULTRUDED FIBRE-REINFORCED STRIP FOR A REINFORCED STRUCTURE, SUCH AS A SPAR CAP

RELATED APPLICATIONS

This is a National Phase Application filed under 35 U.S.C. 371 as a national stage of PCT/EP2021/064990, filed Jun. 4, 2021, an application claiming the benefit of Great Britain Application No. 2008395.2, filed Jun. 4, 2020, both of which are hereby incorporated by reference in their entirety.

FIELD OF THE INVENTION

The present invention relates to a pultruded fibre-reinforced strip and a reinforced structure such as a spar cap comprising a plurality of stacked strips and a wind turbine blade comprising such a spar cap.

BACKGROUND

Wind power is a clean and environmentally friendly source of energy. Wind turbines usually comprise a tower, generator, gearbox, nacelle, and one or more rotor blades. The wind turbine blades capture kinetic energy of wind using known airfoil principles. Modern wind turbines may have rotor blades that exceed 90 meters in length.

Wind turbine blades are usually manufactured by forming two shell parts or shell halves from layers of woven fabric or fibre and resin. Spar caps or main laminates are placed or integrated in the shell halves and may be combined with shear webs or spar beams to form structural support. Spar caps or main laminates may be joined to, or integrated within, the inside of the halves of the shell.

A number of manufacturing steps become more complicated as the blades increase in size. Any mistake made somewhere in the process is increasingly more time consuming to correct. One such process step is precise laying of fibre layers and precured elements on fibre layers already laid up in a blade part mould. Additionally, it is a problem to provide the spar cap with the desired dimensions and tolerances especially of the width and thickness. The width, thickness and length of the spar cap usually increase with the size of the blade.

When manufacturing a wind turbine blade shell part, layers of dry fibre, such as fibre mats, are typically laid up first in a blade shell part mould. These layers will constitute the outer skin of the shell part. After adding the fibre layers, additional layers forming part of the spar cap, one or more precured elements can be added, forming a further part of the spar cap blade shell part. Spar caps are advantageously provided using this method.

The spar caps may comprise a plurality of stacked pultruded fibre-reinforced strips, an interlayer comprising fibre can be arranged between successive pultruded strips. The interlayers can serve as infusion promoting layers and provide a structural connection between the adjacent pultruded strips. However, it is a challenge to provide sufficient reliable fracture toughness in the connections between the pultruded strips and the interlayers.

It is therefore desirable to provide a pultruded fibre-reinforced strip configured to be stacked with similar strips to form a spar cap for a wind turbine blade eliminating or reducing the drawbacks of known spar caps and provide a reliable spar cap with improved fracture toughness.

SUMMARY

The present invention provides a pultruded fibre-reinforced strip configured to be stacked with one or more similar strips to form an elongate reinforcing structure, such as a spar cap for a wind turbine blade, the pultruded strip comprising.

a core comprising a plurality of first fibres embedded in a resin matrix, the plurality of first fibres being carbon fibres and/or glass fibres, and a surface layer enclosing and covering the core and comprising a plurality of second fibres embedded in the resin matrix, the majority of the plurality of second fibres having an elastic modulus less than 10 GPa, such as less than 8 GPa, such as less than 6 GPa, such as less than 4 GPa.

The elastic modulus of the surface layer provides for an improved fracture toughness in the bonding area between the adjacent pultruded strips and in the bonding area between a pultruded strip and adjacent interlayers, thereby providing improved fracture toughness of the spar cap comprising stacked pultruded strips.

The pultruded strips can be stacked in a single stack or in two or more stacks arranged laterally adjacent to each other.

According to an embodiment, the majority of the plurality of the first fibres of the core are carbon fibres and/or glass fibres.

The majority of the fibres of the core can be carbon fibres.

The fibres of the core can essentially consist of carbon fibres.

The core of the strip can comprise biaxial fibre mats, monoaxial fibre mats, rovings, weaved fibre mats, chopped strand mats, non-woven mats of continuous strands, etc. and/or combinations thereof.

According to an embodiment, the second fibres of the surface layer comprise polymeric fibres, such as polyester and/or polyethylene fibres.

The majority of the fibres of the surface layer can be polymeric fibres, such as polyester and/or polyethylene fibres.

The fibres of the surface layer can essentially consist of polymeric fibres, such as polyester and/or polyethylene fibres.

According to an embodiment, the surface layer of the pultruded strip comprises a mat or a veil, such as a non-woven material comprised of uniformly distributed fibres.

The surface layer of the pultruded strip can be a resin rich layer.

The resin rich surface layer can have a resin volume fraction of 60% to 90%.

According to an at present preferred embodiment, the pultruded strip has a first main surface, an opposite second main surface, a first lateral face and an opposite second lateral face, defining an essentially rectangular cross section.

The surface layer defined by opposite main surfaces and the opposite lateral faces preferably covers the subjacent surfaces of the core completely.

The pultruded strip can have a thickness between the opposite main surface of 1 mm to 20 mm such as 1.5 mm to 15 mm, such as 2 mm to 10 mm.

The pultruded strip can have a width between the opposite lateral faces of 20 mm to 400 mm, such as 20 mm to 300 mm.

The pultruded strip can have a length of 2 m to 200 m.

According to an embodiment, the resin matrix of the pultruded strip comprises polyester resin, vinyl ester resin or epoxy resin.

According to a second aspect the present invention relates to a pultrusion process for making a pultruded fibre-reinforced strip suitable to be stacked with one or more similar strips to form an elongated reinforcing structure, such as a spar cap for a wind turbine blade, the pultrusion process comprising: drawing resin impregnated fibres through a pultrusion die to form a core comprising a plurality of first fibres embedded in a resin matrix, the plurality of first fibres being carbon fibres and/or glass fibres, and to form a surface layer enclosing and covering the core and comprising a plurality of second fibres embedded in the resin matrix, the majority of the plurality of second fibres having an elastic modulus less than 10 GPa, such as less than 8 GPa, such as less than 6 GPa, such as less than 4 GPa.

The majority of the plurality of the first fibres can be carbon fibres and/or glass fibres.

The majority of the fibres of the core can be carbon fibres.

The fibres of the core can essentially consist of carbon fibres.

The second fibres of the surface layer can comprise polymeric fibres, such as polyester and/or polyethylene fibres.

The majority of the second fibres of the surface layer can be polymeric fibres, such as polyester and/or polyethylene fibres.

The second fibres of the surface layer can essentially consist of polymeric fibres, such as polyester and/or polyethylene fibres.

The surface layer can comprise a mat or a veil, such as a non-woven material comprised of uniformly distributed fibres.

The surface layer can be a resin rich layer.

The resin rich surface layer can have a volume fraction of resin of 60% to 90%.

The strip can have a first main surface, an opposite second main surface, a first lateral face and an opposite second lateral face, defining an essentially rectangular cross section.

The surface layer defined by the opposite main surfaces and the opposite lateral faces can cover the subjacent surfaces of the core completely.

The strip has a thickness between the opposite main surfaces of 1 mm to 20 mm such as 1.5 mm to 15 mm, such as 2 mm to 10 mm.

The strip can have a width between the opposite lateral faces of 20 mm to 400 mm, such as 20 mm to 300 mm.

The resin matrix can comprise polyester resin, vinyl ester resin or epoxy resin.

According to a further aspect, the present invention relates to a reinforcing structure, such as a spar cap of a wind turbine blade, comprising a stack of a plurality of pultruded strips being connected or integrated together, wherein the strips are pultruded strips according to the present invention.

The pultruded strips of the reinforcing structure, such as a spar cap, can be stacked on top of each other, main surface against main surface.

The stacked strips can be embedded in a resin, optionally the same resin as the resin matrix of the pultruded strips.

The surface layer of the pultruded strips of the reinforcing structure can be uncured or semi-cured thereby providing an intimate contact and connection between the main surfaces of the stacked strips and/or the lateral surfaces of the strips of two or more laterally arranged stacks of strips.

The pultruded strips of the reinforcing structure, such as a spar cap, can be stacked with an interlayer comprising fibres arranged between the main surfaces of successive pultruded strips, with at least the interlayers being embedded in a resin.

The interlayers can comprise glass fibres and/or carbon fibres.

The resin of the reinforcing structure can be essentially the same resin as the resin matrix of the pultruded strips.

The main surfaces and optionally also the lateral surfaces of the pultruded strips can be grinded surfaces in order to control the surface roughness and cleanness to ensure proper bonding to the infusion resin.

According to a further aspect the present invention relates to a method of making an elongate reinforcement structure, such as a spar cap for a wind turbine blade comprising: providing a plurality of strips according to any of the claims 1-15 and/or being made according to the pultrusion process of any of the claims 16-19, forming a laminate by stacking the plurality of strips in a mould, infusing resin through the laminate and allow the resin to cure to form the elongate reinforcement structure.

Additionally, the present invention relates to a wind turbine blade comprising a reinforcing structure, such as a spar cap, according to the invention.

Finally, the present invention relates to a wind turbine comprising a wind turbine blade according to the present invention.

BRIEF DESCRIPTION OF THE FIGURES

Embodiments of the invention will be described in more detail in the following with regard to the accompanying figures. The figures show one way of implementing the present invention and are not to be construed as being limiting to other possible embodiments falling within the scope of the attached claim set.

DETAILED DESCRIPTION

Figure 1:
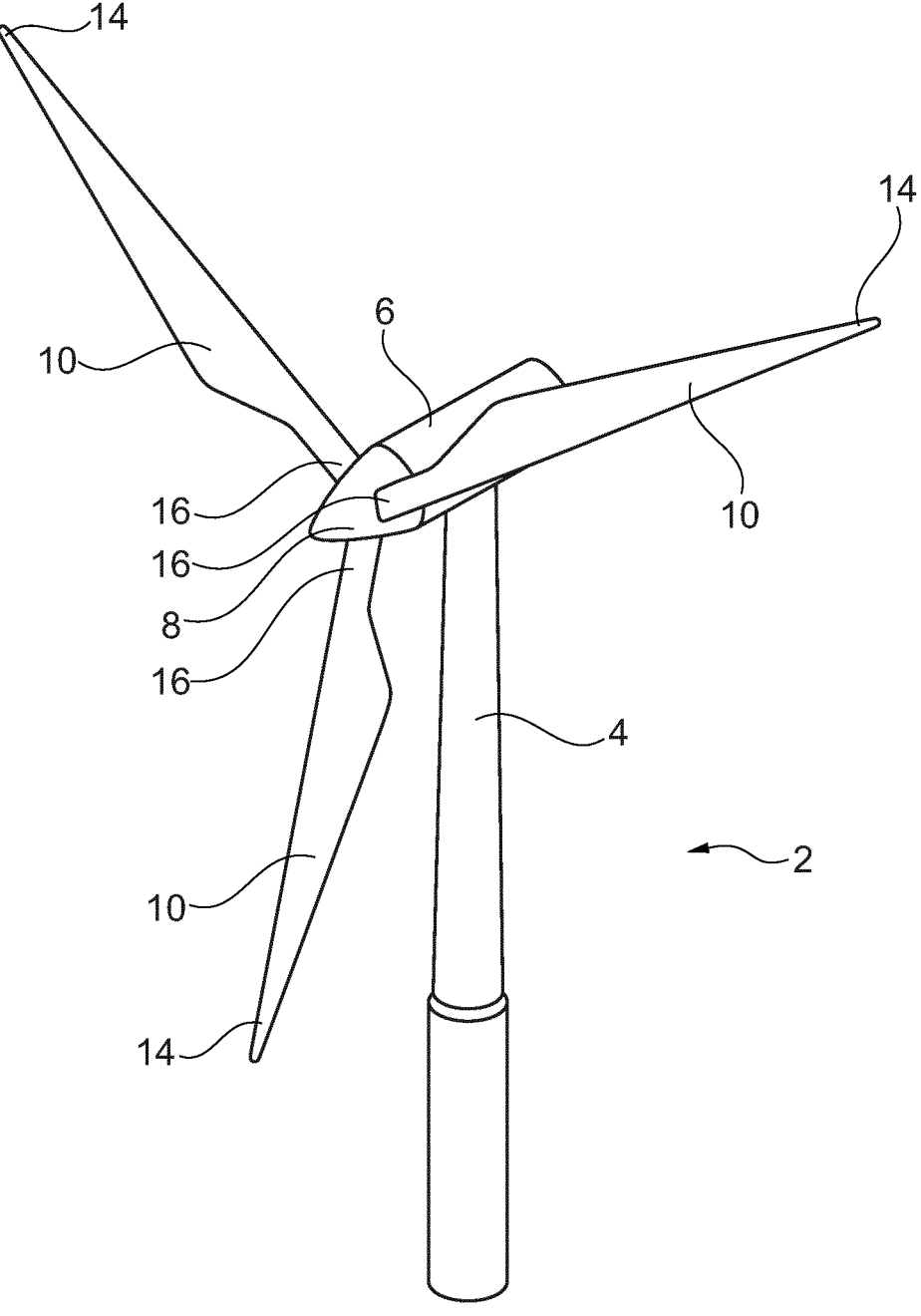
FIG. 1 is a schematic view illustrating an exemplary wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each blade having a blade root 16 nearest the hub and a blade tip 14 furthest from the hub 8. The invention is not limited to use in wind turbines of this type.

Figure 2:
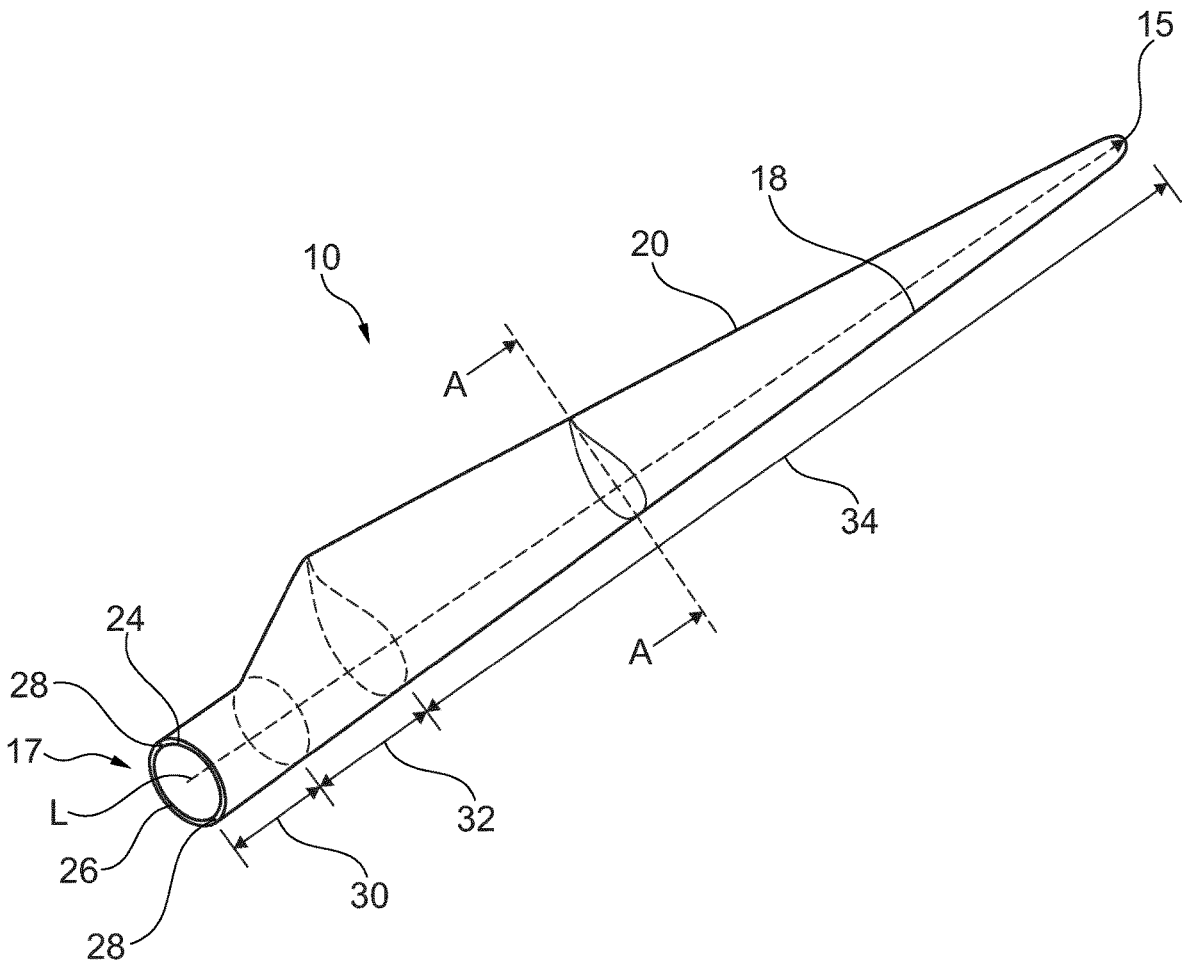
FIG. 2 is a schematic view illustrating an exemplary wind turbine blade.

FIG. 2 shows a schematic view of an exemplary wind turbine blade 10. The wind turbine blade 10 has the shape of a conventional wind turbine blade with a root end 17 and a tip end 15 and comprises a root region 30 closest to the hub, a profiled or airfoil region 34, and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) preferably has an ideal shape with respect to generating hub rotation, whereas the root region 30 due to structural considerations has a substantially circular or elliptical cross-section, which for instance makes it easier and safer to mount the blade 10 to the hub. The diameter of the root region 30 may be constant along the entire root area 30. The transition region 32 present in the wind turbine blade 10 in this example has a transitional profile gradually changing from the circular shape of the root region 30 to the airfoil profile of the airfoil region 34. The chord length of the transition region 32 typically increases in an outward direction from the hub. The airfoil region 34 has an airfoil profile with a chord extending between the leading edge 18 and the trailing edge 20 of the blade 10.

It should be noted that different sections of the blade normally do not have a common plane, since the blade may be twisted and/or curved (i.e. pre-bent) along a direction from the root region to the tip, this being most often the case, for instance to more or less compensate for the local velocity of the blade being dependent on the distance from the hub.

The wind turbine blade 10 comprises a blade shell which may for instance comprise two blade shell parts, a first blade shell part 24 and a second blade shell part 26, for instance made at least partly of fibre-reinforced polymer. The first blade shell part 24 may for instance be part of a pressure side or upwind blade part. The second blade shell part 26 may for instance be part of a suction side or downwind blade part. The first blade shell part 24 and the second blade shell part 26 are typically joined, such as glued together, along bond lines or glue joints 28 extending along the trailing edge and the leading edge 18 of the blade 10. Typically, the root ends of the blade shell parts 24, 26 have a semi-circular or semi-oval outer cross-sectional shape that, when the first and second shell parts are joined, forms the root region, such as a circular or oval root region.

Figure 3:
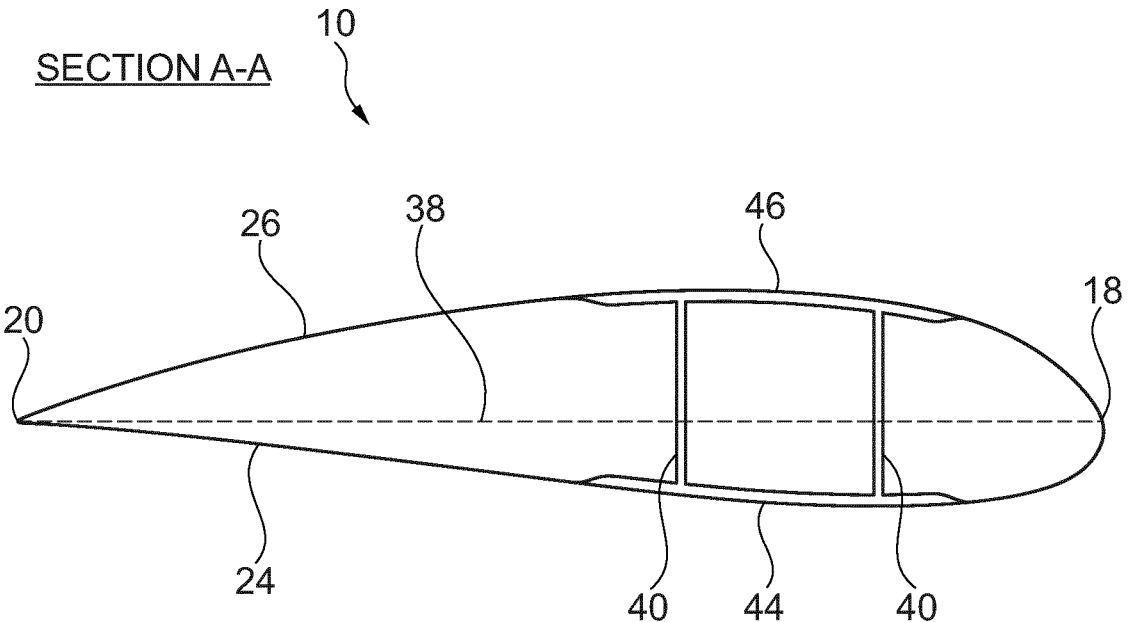
FIG. 3 is a schematic view illustrating a cross-section of an exemplary wind turbine blade.

FIG. 3 is a schematic diagram illustrating a cross-sectional view of the exemplary wind turbine blade 10, corresponding to line A-A in FIG. 2. The wind turbine blade 10 comprises shear webs 40, a first spar cap 44 that is part of the pressure side 24 of the blade 10, and a second spar cap 46 that is part of the suction side 26 of the blade 10. The spar caps provide structural strength to the blade and typically extend along the blade in a spanwise direction. Typically, spar caps will extend over 60-95% of the blade length. The trailing edge 20 and leading edge 18 are also indicated in FIG. 3.

Figure 4:
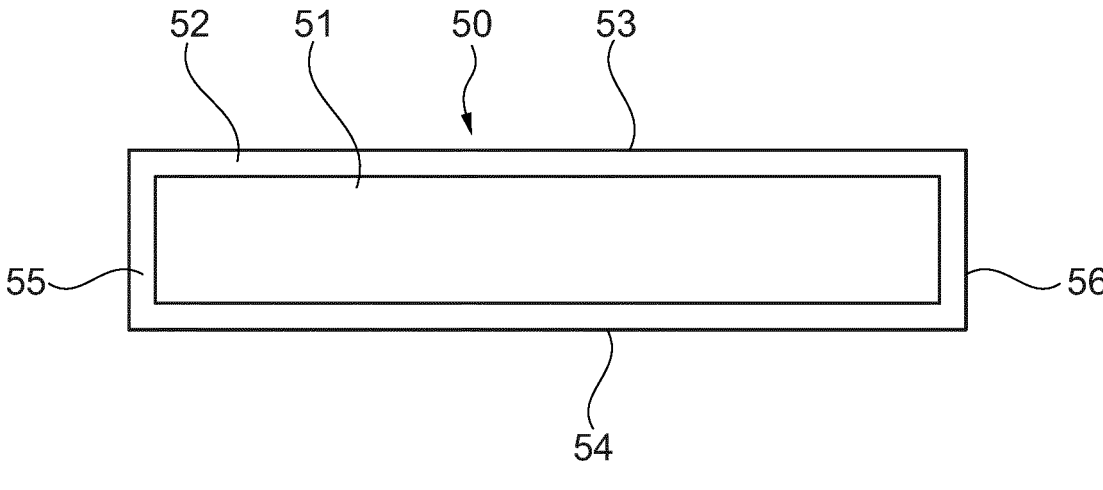
FIG. 4 is a schematic cross-sectional view of a pultruded strip of fibre-reinforced resin composite material.

FIG. 4 discloses a schematic cross-sectional view of an exemplary pultruded strip 50 of fibre-reinforced resin composite material. The pultruded fibre-reinforced strip 50 is configured to be stacked with one and more similar strips to form a spar cap for a wind turbine blade and comprises a core 51 and a surface layer 52 enclosing and covering the core 51. In the embodiment shown, the strip 50 has an essentially rectangular cross-section and comprises a first main surface 53, an opposite second main surface 54, a first lateral face 55 and an opposite second lateral face 56. The thickness of the strip between the opposite main surfaces can e.g. be 1 mm to 10 mm, the width of the strip between the opposite lateral faces can e.g. be 20 mm to 400 mm and the length of the strip can e.g. be 10 m to 200 m.

The core 51 comprises a plurality of first fibres embedded in a resin matrix. The first fibres can comprise carbon fibres and/or glass fibres. At present, it is preferred that the majority of the fibres of the core 51 are carbon fibres or that the core essentially consist of carbon fibre. The core can be provided by biaxial fibre mats, monoaxial fibre mats, rovings, weaved fibre mats, chopped strand mats, non-woven mats of continuous strands, etc. and/or combinations thereof.

The surface layer 52 defined by the opposite main surfaces and the opposite lateral faces covers and encloses the subjacent surfaces of the core 51 completely. The surface layer 52 comprises a plurality of second fibres imbedded in the resin matrix. A majority of the plurality of the second fibres of the surface layer has an elastic modulus less than 10, 8, 6 or 4 GPa. At present the preferred fibres are polymeric fibres, such as e.g. polyester and/or polyethylene fibres. The surface layer can comprise a non-woven fibre material comprising or essentially consisting of uniformly distributed continuous strands. Further, the surface layer can essentially consist of polymeric fibres, such as polyester and/or polyethylene fibres.

Figure 5:
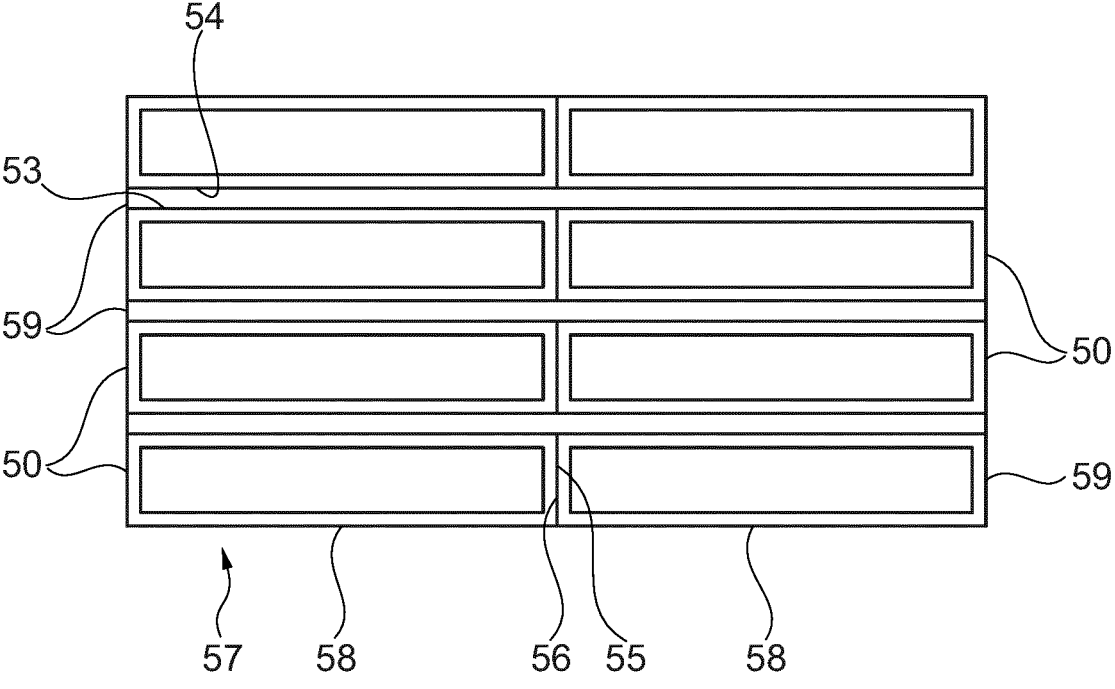
FIG. 5 is a schematic cross-sectional view illustrating a spar cap for a wind turbine blade comprising two laterally adjacent arranged stacks of pultruded strips as shown in FIG. 4 stacked with interlayers comprising fibre material between the succeeding strips.

FIG. 5 is a schematic cross-sectional view illustrating an exemplary spar cap 57 for a wind turbine blade comprising two laterally adjacent arranged stacks 58 of pultruded strips 50 as shown in FIG. 4 stacked with interlayers 59 comprising fibre material between succeeding strips 50. The main surfaces and optionally also the lateral surfaces of the pultruded strips can be grinded surfaces in order to control the roughness and the cleanness to ensure proper bonding to an infusion resin. The fibre material of the interlayers can be a resin-infusion promoting fibre layer promoting infusion of a resin in the interlayers 59. The infusion of the resin in the interlayers 59 can be carried out after the stacks of pultruded strips 50 and interlayers 59 have been arranged on a skin layer of fibres in a mould part for moulding a wind turbine blade half shell. The infusion of resin in the interlayers 59 takes place at the same time as infusion of the shell of the blade half part. Alternatively, the infusion of the interlayers 59 can be carried out in a separate spar cap mould. Subsequently, the moulded spar cap 57 is arranged on the skin layer of fibres in a mould part for moulding a wind turbine blade half shell and the skin layer and additional fibre layers are infused with a resin.

The surface layer 52 defining the main surfaces 53, 54 of the pultruded strips 50 provides after infusion of the resin a bond of high fracture toughness between the pultruded strips 50 and adjacent interlayers 59. Additionally, the surface layer 52 defining of the lateral faces 55, 56 of the pultruded strips 50 provides at least a sufficient fracture toughness in the connections between the adjacent lateral surfaces 55, 56 of the pultruded strips 50 of the two laterally adjacent arranged stacks 58.

The infused resin can be the same resin as the resin matrix of the pultruded strips 50.

Figure 6:
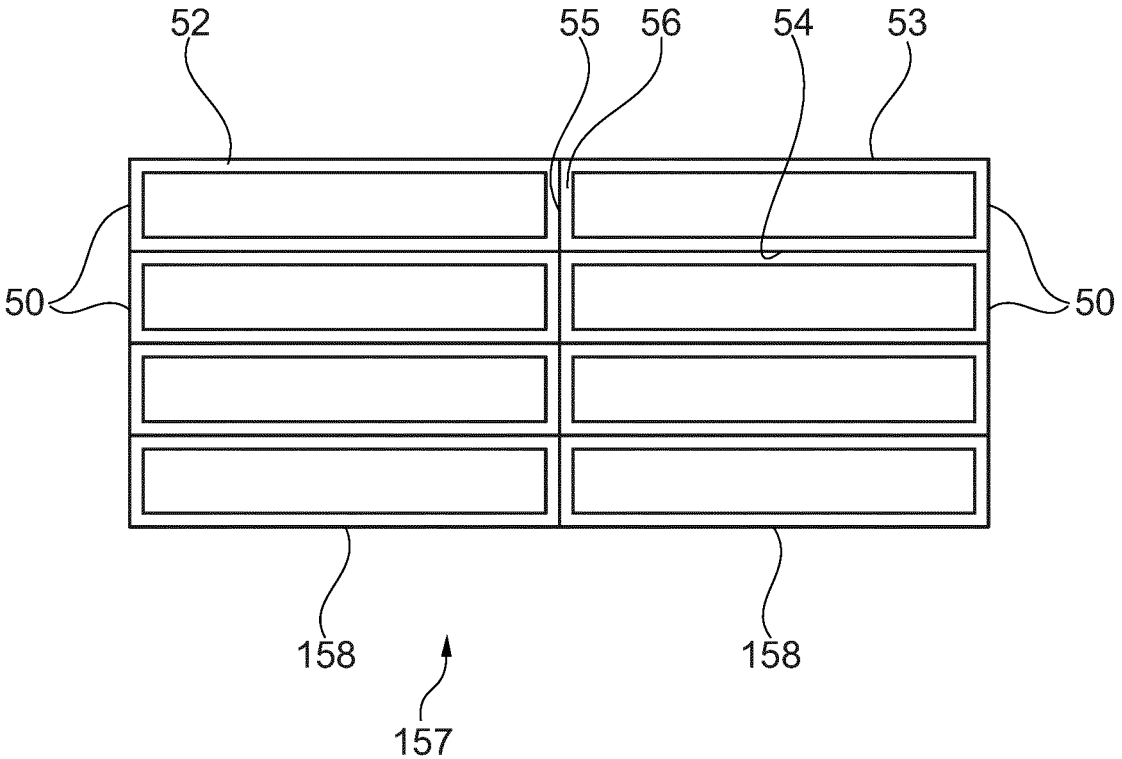
FIG. 6 is a schematic cross-sectional view illustrating a spar cap for a wind turbine blade comprising two laterally adjacent arranged stacks of pultruded strips as shown in FIG. 4 stacked without interlayers between the succeeding strips.

FIG. 6 is a schematic cross-sectional view illustrating an exemplary spar cap 157 for a wind turbine blade comprising two laterally adjacent arranged stacks 158 of pultruded strips as shown in FIG. 4 stacked without interlayers between succeeding strips 50.

The stacks 158 of pultruded strips 50 can be arranged on a skin layer of fibres in a mould part for moulding a wind turbine blade half shell. Thereafter infusion of a resin is carried out on the skin layer and additional fibre layers of the blade shell half part such as fibre layers covering the stacks 158. Thereby, resin will enter between adjacent surfaces 53, 54 and 55, 56 of the adjacent arranged pultruded strips 50 and provide a connection between the adjacent surfaces and thereby the adjacent strips 50. The surface layers 52 of the pultruded strips 50 provide an improvement of the fracture toughness of the mentioned connections. Alternatively, the surface layers 52 of the pultruded strips 50 can be uncured or semi-cured when the pultruded strips are stacked, thereby improving the connection between adjacent surfaces of the strips.

Alternatively, the stacks of pultruded strips 50 can be arranged in a spar cap mould and adjacent surfaces 53, 54 and 55, 56 of the strips 50 be mutually bonded by infusion of a resin between the adjacent surfaces of the strips. Alternatively, the pultruded strips 50 can be uncured or semi-cured when stacked. After curing of the resin of the pultruded strips 50 the formed spar cap 157 can be arranged on the fibre skin layer arranged on the moulding face of a wind turbine blade half shell mould. The shell is thereafter infused with a resin as described above.

The infused resin can be the same resin as the resin matrix of the pultruded strips 50.

LIST OF REFERENCES

2 wind turbine
4 tower
6 nacelle
8 hub
10 blade
14 blade tip
15 tip end
16 blade root
17 root end
18 leading edge
20 trailing edge
24 first blade shell part (pressure side)
26 second blade shell part (suction side)
28 bond lines/glue joints
30 root region
32 transition region
34 airfoil region
40 shear web
44 first spar cap
46 second spar cap
50 pultruded strip
51 core
52 surface layer
53 first main surface
54 second main surface
55 first lateral face
56 second lateral face
57, 157 spar cap
58,158 stack
59 interlayer

The invention claimed is:

1. A pultruded fibre-reinforced strip configured to be stacked with one or more similar pultruded fibre-reinforced strips to form an elongate reinforcing structure, the pultruded fibre-reinforced strip comprising:
   a core comprising a plurality of first fibres embedded in a resin matrix, the plurality of first fibres being carbon fibres and/or glass fibres; and
   a surface layer enclosing and covering the core and comprising a plurality of second fibres embedded in the resin matrix, a majority of the plurality of second fibres having an elastic modulus less than 10 GPa,
   wherein the surface layer has opposed main surfaces and opposed lateral faces, and wherein the pultruded strips are each configured to be stacked on top of each other such that one of the main surfaces of one of the pultruded strips is positioned against one of the main surfaces of an adjacent one of the pultruded strips.

2. The pultruded fibre-reinforced strip according to claim 1, wherein a majority of the plurality of the first fibres are carbon fibres and/or glass fibres.

3. The pultruded fibre-reinforced strip according to claim 1, wherein the majority of the fibres of the core are carbon fibres.

4. The pultruded fibre-reinforced strip according to claim 1, wherein the fibres of the core consist essentially of carbon fibres.

5. The pultruded fibre-reinforced strip according to claim 1, wherein the second fibres of the surface layer comprise and/or consist essentially of polymeric fibres.

6. The pultruded fibre-reinforced strip according to claim 1, wherein the majority of the second fibres of the surface layer are polymeric fibres.

7. The pultruded fibre-reinforced strip according to claim 1, wherein the surface layer comprises a mat or a veil.

8. The pultruded fibre-reinforced strip according to claim 1, wherein the surface layer is a resin rich layer.

9. The pultruded fibre-reinforced strip according to claim 8, wherein the resin rich surface layer has a volume fraction resin of 60% to 90%.

10. The pultruded fibre-reinforced strip according to claim 1, wherein the strip has a first main surface, an opposite second main surface, a first lateral face and an opposite second lateral face, defining an essentially rectangular cross section.

11. The pultruded fibre-reinforced strip according to claim 10, wherein the surface layer defined by the opposite main surfaces and the opposite lateral faces cover the subjacent surfaces of the core completely.

12. The pultruded fibre-reinforced strip according to claim 10, wherein the strip has a thickness between the opposite main surfaces of 1 mm to 20 mm, and/or wherein the strip has a width between the opposite lateral faces of 20 mm to 400 mm.

13. The pultruded fibre-reinforced strip according to claim 1, wherein the resin matrix comprises polyester resin, vinyl ester resin or epoxy resin.

14. A pultrusion process for making a pultruded strip suitable to be stacked with one or more similar pultruded strips to form an elongated reinforcing structure, the pultrusion process comprising:
   drawing resin impregnated fibres through a pultrusion die to form a core comprising a plurality of first fibres embedded in a resin matrix, the plurality of first fibres being carbon fibres and/or glass fibres, and to form a surface layer enclosing and covering the core and comprising a plurality of second fibres embedded in the resin matrix, a majority of the plurality of second fibres having an elastic modulus less than 10 GPa,
   wherein the surface layer has opposed main surfaces and opposed lateral faces, and wherein the pultruded strips are each configured to be stacked on top of each other such that one of the main surfaces of one of the pultruded strips is positioned against one of the main surfaces of an adjacent one of the pultruded strips.

15. A reinforcing structure, comprising a stack of a plurality of pultruded strips being connected or integrated together, wherein the plurality of pultruded strips are pultruded fibre-reinforced strips according to claim 1.

16. The reinforcing structure according to claim 15, wherein the pultruded strips are stacked with an interlayer comprising fibres arranged between the main surfaces of successive ones of the pultruded strips and being embedded in a resin.

17. The reinforcing structure according to claim 16, wherein the main surfaces and optionally also the lateral surfaces of the pultruded strips are grinded surfaces.

18. A method of making an elongate reinforcement structure, comprising:

proviidng a plurality of pultruded fibre-reinforced strips according to claim 1;

forming a laminate by stacking the plurality of pultruded fibre-reinforced strips in a mould; and infusing resin through the laminate and allowing the resin to cure to form the elongate reinforcement structure.

19. A wind turbine blade comprising the reinforcing structure according to claim 15.

\* \* \* \* \*